J. SHAW.
TUBULAR WELL.
No. 101,774. Patented Apr. 12, 1870.
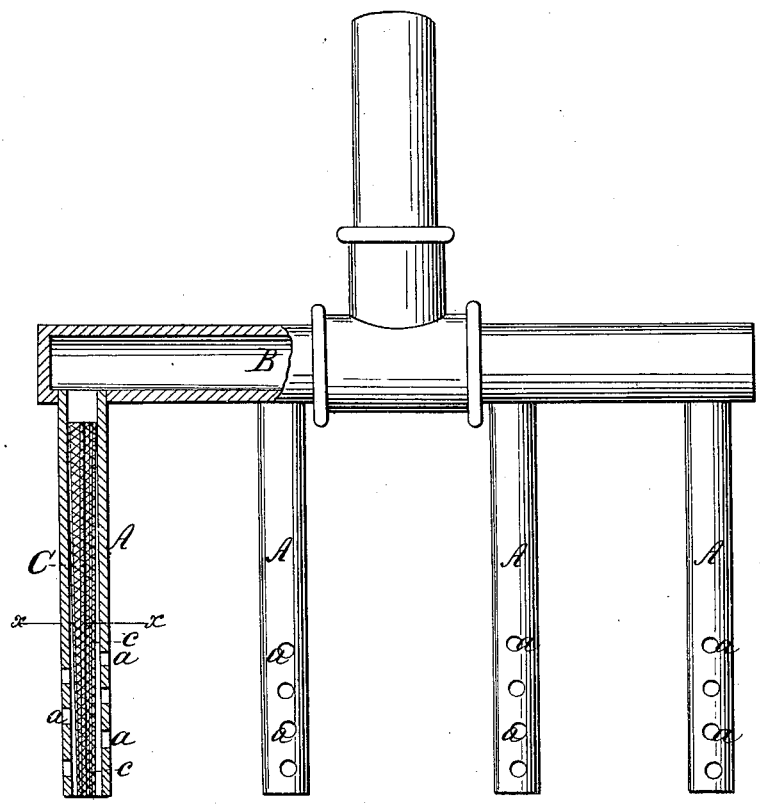

United States Patent Office.

JEHYLEMAN SHAW, OF BRIDGEPORT, CONNECTICUT.

Letters Patent No. 101,774, dated April 12, 1870; antedated April 4, 1870.

IMPROVEMENT IN TUBULAR WELLS.

The Schedule referred to in these Letters Patent and making part of the same.

*To all whom it may concern:*

Be it known that I, JEHYLEMAN SHAW, of Bridgeport, in the county of Fairfield and State of Connecticut, have invented a new and useful Improvement in Tubular Wells; and I do hereby declare that the following is a full, clear, and exact description thereof, which will enable those skilled in the art to make and use the same, reference being had to the accompanying drawings forming part of this specification.

This invention relates to certain new and useful improvements in tubular wells, such as are formed by driving, or otherwise forcing directly into the earth until water is reached, metallic tubes of small diameter, the tubes remaining fixed in the earth.

These wells, in many instances, where water is required in large quantities, do not afford singly a sufficient supply, and a plurality of tubes is sunk in quite close proximity.

My invention consists, first, in connecting the upper ends of these tubes by a pipe to which the pump-cylinder is attached, and communicates so that with one and the same pump water may be drawn from all the wells.

My invention consists, second, in a novel strainer for the tubes, whereby gravel is effectually prevented from being drawn into the tubes, and the latter choked up thereby.

In the accompanying sheet of drawings—

Figure 1 is a view of a series of well-tubes connected together according to my invention.

Figure 2, a detached horizontal section of the strainer and the tube within which it is fitted; $x\ x$, fig. 1, shows the line of section.

Similar letters of reference indicate corresponding parts.

A represents four well-tubes, the lower ends of which are perforated with holes $a$.

The upper ends of the tubes A, after or before they are driven into the ground the required depth, are all connected to a pipe, B, with which the pump-cylinder (shown in red) communicates.

Where practicable, it would be better to have the tubes A driven into the earth in line with each other, as a straight pipe, B, may then be used; but if the tubes A are not in line, the pipe B would require to be in sections, connected by angular couplings, which would materially increase the cost.

By this simple arrangement, a single pump may be made to answer for a plurality of well-tubes, and a requisite quantity of water obtained in all cases.

C represents a strainer, which is constructed of wire-cloth, or finely-perforated metal plate, and bent or formed into a taper tube of any suitable length.

This tube has fitted within it, and extending its whole length, two plates, $b\ b$, which cross each other at right angles in their horizontal section, as shown in fig. 2.

These plates serve to support the strainer, preventing it from being forced or pressed in laterally, while the taper form of the strainer admits of the free passage of the water into it, owing to the space $c$ allowed between its lower part and the inner surface of the tube in which it is fitted.

The upper end of the strainer is fitted tightly in the tube, and may be provided with packing to insure that result.

I claim as new and desire to secure by Letters Patent—

1. The adapting of a single pump to a plurality of well-tubes, by connecting the upper ends of the latter to a pipe with which the pump-cylinder communicates, substantially as shown and described.

2. The inserting of the plates $b\ b$ within the strainer C, said plates being crossed so as to be at right angles with each other in their transverse section, and the strainer of taper form longitudinally, substantially as and for the purpose specified.

J. SHAW.

Witnesses:
WM. F. MCNAMARA,
ALEX. E. ROBERTS.